(12) United States Patent
Angelo et al.

(10) Patent No.: US 6,568,992 B1
(45) Date of Patent: May 27, 2003

(54) METHOD FOR CONTROLLING MRE STRIPE HEIGHT

(75) Inventors: James E. Angelo, Savage, MN (US); Zine-Eddine Boutaghou, Vadnais Heights, MN (US)

(73) Assignee: Seagate Technology, LLC., Scotts Valley, CA (US)

( * ) Notice: Subject to any disclaimer, the term of this patent is extended or adjusted under 35 U.S.C. 154(b) by 55 days.

(21) Appl. No.: 09/828,489

(22) Filed: Apr. 6, 2001

Related U.S. Application Data
(60) Provisional application No. 60/197,226, filed on Apr. 14, 2000.

(51) Int. Cl.$^7$ ................................. B24B 49/00
(52) U.S. Cl. ................... 451/8; 451/5; 451/259; 29/603.12
(58) Field of Search ....................... 451/5, 8, 9, 10, 451/11, 28, 259, 272, 273, 177, 276, 389, 279, 446, 285; 29/603.01, 593, 603.12, 603.15, 603.16; 360/75, 103, 104

(56) References Cited

U.S. PATENT DOCUMENTS

| | | | | |
|---|---|---|---|---|
| 4,914,868 A | * | 4/1990 | Church et al. | 29/603.09 |
| 4,928,030 A | * | 5/1990 | Culp | 310/317 |
| 5,117,589 A | * | 6/1992 | Bischoff et al. | 269/234 |
| 5,525,091 A | * | 6/1996 | Lam et al. | 451/1 |
| 5,632,669 A | * | 5/1997 | Azarian et al. | 29/603.08 |
| 5,885,131 A | * | 3/1999 | Azarian et al. | 29/603.08 |
| 5,951,371 A | * | 9/1999 | Hao | 29/593 |
| 5,967,878 A | * | 10/1999 | Arcona et al. | 451/11 |
| 6,112,401 A | * | 9/2000 | Smith, Jr. | 29/603.07 |
| 6,174,218 B1 | * | 1/2001 | Church et al. | 451/364 |
| 6,193,584 B1 | * | 2/2001 | Rudy et al. | 29/593 |
| 6,346,029 B1 | * | 2/2002 | Church et al. | 451/11 |
| 6,358,123 B1 | * | 3/2002 | Liners et al. | 451/246 |

* cited by examiner

Primary Examiner—Joseph J. Hail, III
Assistant Examiner—Hadi Shakeri
(74) Attorney, Agent, or Firm—Kinney & Lange, P.A.

(57) ABSTRACT

A method for lapping a magnetic read/write element on a slider having a shear based transducer is disclosed. The shear based transducer is used during the fabrication process to more precisely lap the MR element. The method comprises measuring the stripe height of the MR element and actuating the shear based transducer to move the MR element to a desired position relative to a lapping apparatus. The MR element is then lapped to achieve a desired stripe height.

18 Claims, 5 Drawing Sheets

METHOD FOR CONTROLLING MRE STRIPE HEIGHT

CROSS-REFERENCE TO RELATED APPLICATION(S)

This application claims priority from Provisional Patent Application Serial No. 60/197,226 filed on Apr. 14, 2000, for "A Method for Controlling MRE Stripe Height" by James E. Angelo and Zine-Eddine Boutaghou. Provisional Patent Application No. 60/197,226 is incorporated by reference herein.

BACKGROUND OF THE INVENTION

The present invention relates generally to the field of magnetic data storage and retrieval systems. Specifically, the present invention relates to a method of controlling the stripe height of a magnetoresistive (MR) element.

Disc drives are well known in the art and comprise several discs, each disc having several concentric data tracks for storing data. A magnetic read/write transducing head carried by a slider is used to read from or write to a data track on a disc. Such sliders, as well as the transducing heads, are typically produced by using thin film deposition techniques. In a typical process, an array of sliders are formed on a common substrate or wafer. The wafer is typically inspected, and is then sliced to produce bars, with a row of sliders in a side-by-side pattern on each bar. The bars are then lapped at the surface that will eventually face the recording medium to obtain the desired magnetoresistive (MR) element height (also referred to as thee specified stripe height). After lapping, an air bearing pattern is formed on the bars and the bars are diced to produce individual sliders.

With the move to higher areal densities on discs, there is extreme pressure to reduce the stripe height on the sliders. Reducing the stripe height permits an increase in areal densities and signal quality. However, problems emerge as stripe heights drop below one-tenth of a micro-inch. As stripe heights are reduced, seemingly minor variances in the stripe heights from slider to slider will produce different signal amplitudes in each of the sliders. These differing amplitudes make it difficult to control the signal from slider to slider. Thus, though it desired to reduce the stripe heights, it is also desired that the MR elements for each slider on the bar be lapped to the same stripe height.

To achieve reduced stripe heights on the sliders, accurate control of the manufacturing process has become critical. In particular, tight control of the lapping process is required to achieve the finished stripe heights within the desired tolerance on each slider on the bar. Current efforts for controlling the lapping process involves placing one or more lapping sensors on the bar. During the lapping process, material is removed from the surface of the bar. As material is removed from the surface of the bar, material is likewise removed from the lapping sensors attached to the bar. The lapping sensors have a known resistance per unit of thickness so that as the surface of the bar is lapped, the resistance of the lapping sensor changes. The lapping sensors are monitored during lapping to provide feedback to a control system indicating the amount of material being removed from the bar by the lapping device.

Included as part of the control system is a fixture for holding the bar above the lapping mechanism. The fixture, and thus the bar, can be moved relative to the lapping mechanism. The fixture is controlled based on the feedback from the lapping sensors to move the bar and allow the lapping mechanism to remove an amount of material during lapping corresponding to a given resistance of the lapping sensor. Upon achieving the desired resistance of the lapping sensor, it is estimated that the desired stripe heights of the sliders on the bar are also achieved. Once the desired resistance of the lapping sensor is reached, the fixture can be controlled to remove the bar from the lapping device.

These current slider finishing processes lack the accuracy required to achieve the desired reduced stripe heights within the desired tolerance for each slider on the bar. In particular, the lapping sensors provide only a local measure of material removal, so that sliders on a given bar which are located far from the sensor may not be lapped to the appropriate height. In addition, the bar is very long compared to the dimensions of interest, and it is difficult to align the parts in the fixture so that all the sliders are lapped equally. With the desired stripe heights dropping to below 0.1 micrometers, current lapping systems are inadequate.

Thus, there is a continuing need in the art for improved slider lapping systems which allow for tight tolerance control in finishing the stripe heights of sliders on a bar.

BRIEF SUMMARY OF THE INVENTION

The present invention is a method for lapping the MR element on a slider having a shear based transducer. The slider's shear based transducer is used during the lapping process to more precisely position the portion of the slider carrying the MR element relative to the lapping mechanism. Each slider likewise has a sensor for sensing the stripe height during the lapping process. Based on the sensed stripe height, the shear based transducer can be actuated to move the MR element to a desired position relative to a lapping device. By monitoring the sensed stipe height, the shear based transducer can be controlled to ensure the MR element is precisely lapped to the desired stripe height.

DETAILED DESCRIPTION

Figure 1:
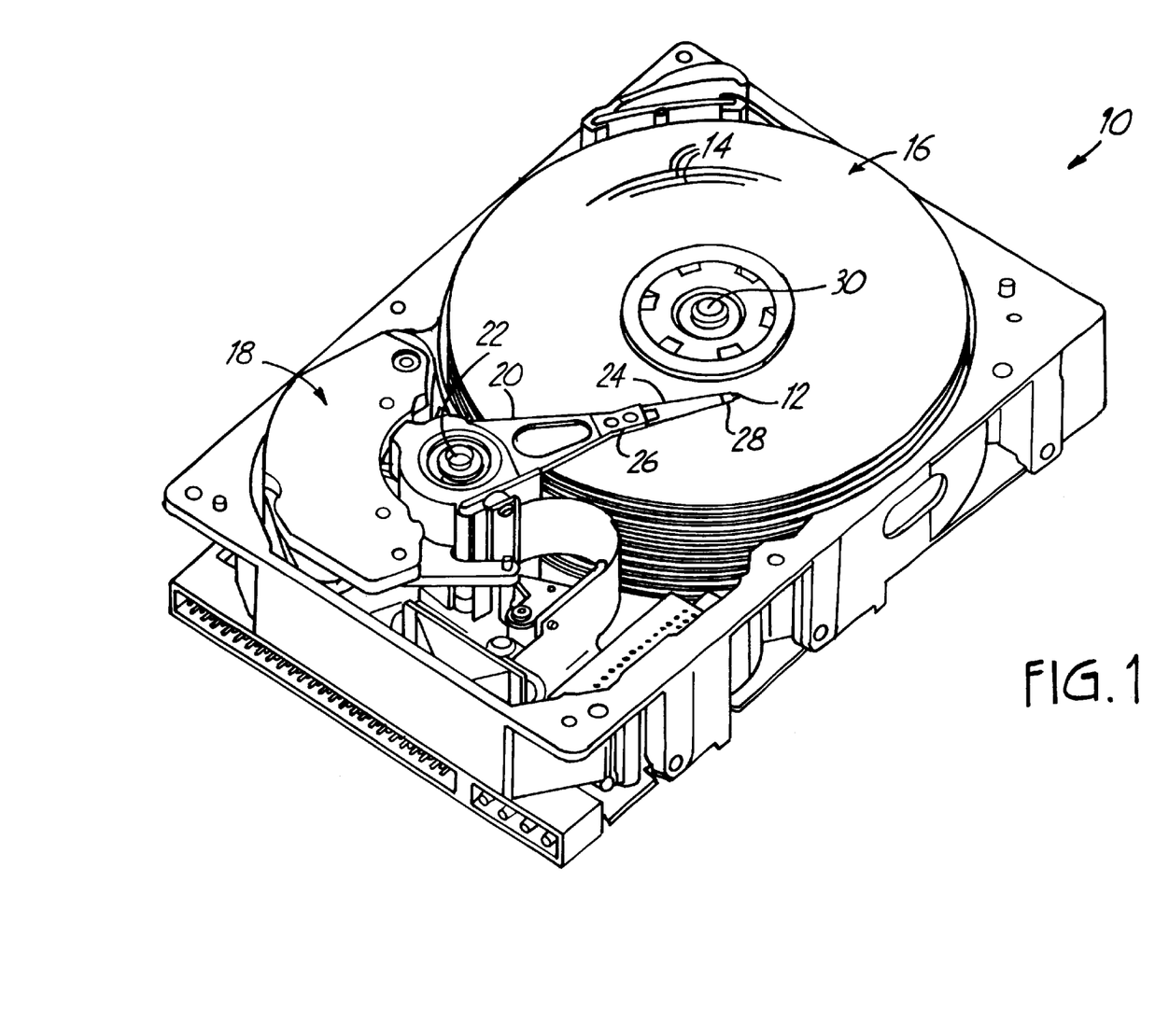
FIG. 1 is a perspective view of a disc drive actuation system for positioning a slider over tracks of a disc.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate an actuator arm 20 around an axis 22 on a spindle. The slider suspension includes a load beam 24 connected to the actuator arm 20 at a slider mounting block 26. A flexure 28 is connected to the end of the load beam 24, and carries the slider 12. The slider 12 carries a magnetoresistive (MR) element (not shown) for reading and/or writing data on the concentric tracks 14 of the disc 16. The disc 16 rotates around an axis 30, which keeps the slider 12 aloft a small distance above the surface of the disc 16 as described in greater detail below.

Figure 2:
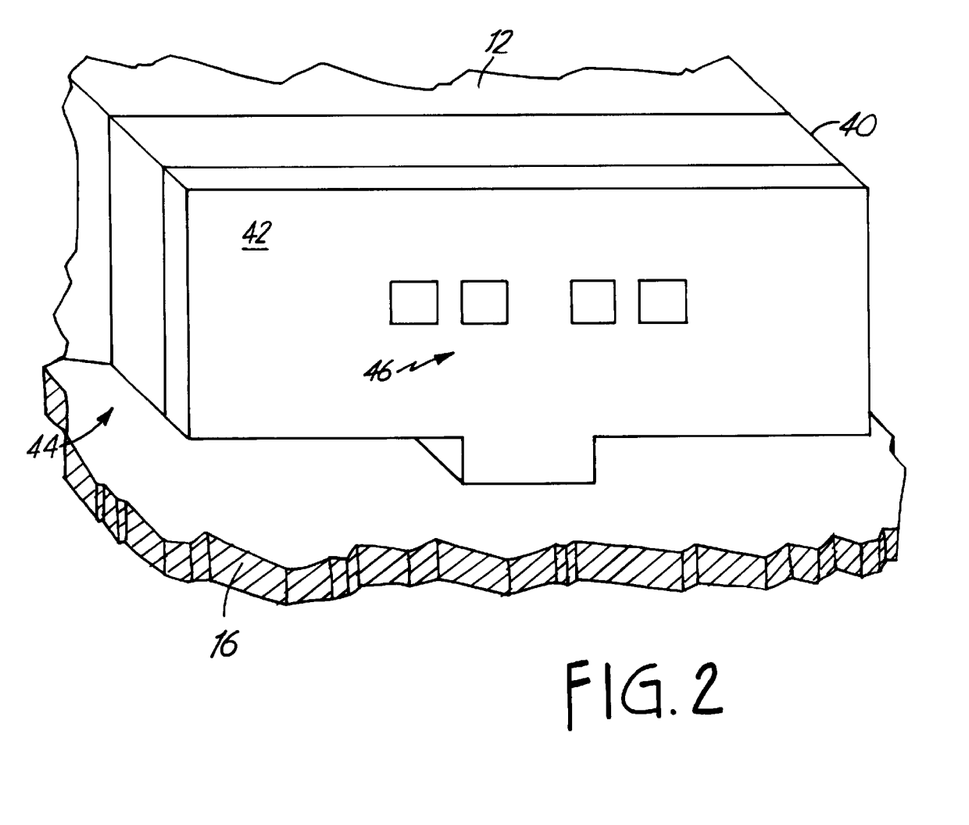
FIG. 2 is a greatly enlarged perspective view of a disc drive slider having a shear based transducer as the slider is positioned over a disc.

To achieve the desired performance of the disk drive, the distance the slider 12 flies above the disc 16 (the "fly height") must be precisely controlled. One particular slider design allowing for such precise fly height control is disclosed in U.S. patent application Ser. No. 09/472,262, entitled "Shear-based Transducer For HDD Read/Write Element Height Control." FIG. 2 is a greatly enlarged perspective view of the disc drive slider 12 disclosed in U.S. patent application Ser. No. 09/472,262.

Application Ser. No. 09/472,262 discloses a slider 12 having a shear based transducer 40 for positioning a portion of the slider 12 above the surface of the disc 16. The slider 12 includes a trailing edge surface 42, an air bearing surface 44, and bond pads 46. The MR element (not shown) is carried by the slider 12 at the trailing edge surface 42 for reading and writing data to and from the disc 16. The bond pads 46 on the trailing edge surface 42 provide an area for electronic leads to be attached to the slider 12, thus allowing electronic signals to pass to and from the MR element.

The shear transducer 40 allows the portion of the slider 12 carrying the MR element (near the trailing edge surface 42) to be adjusted so that it more closely follows the surface of the disc 16 as the slider 12 moves over the disc 16 surface. Specifically, it is possible to apply a voltage across the shear transducer 40 to cause a portion of the slider near the trailing edge surface 42 to shear, or move closer to or further away from the surface of the disc 16.

Figure 3:
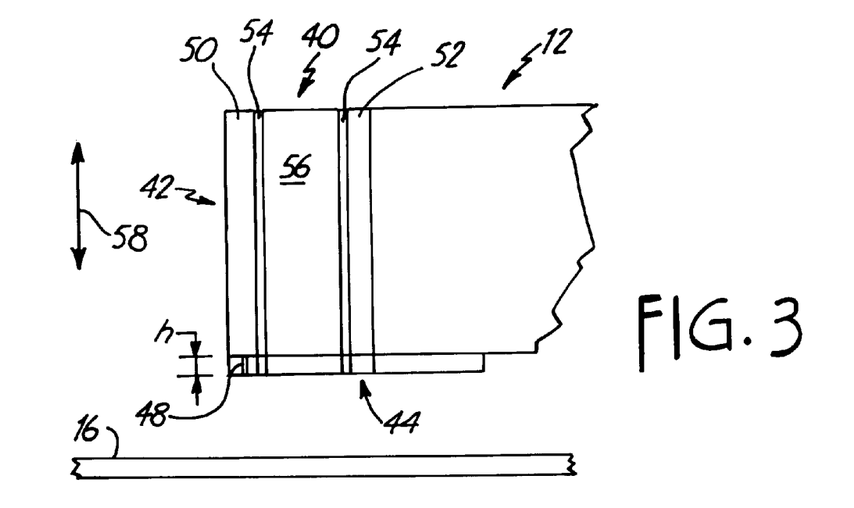
FIG. 3 is a cross sectional side view of the slider having a shear based transducer as the slider is positioned over a disc.

FIG. 3 is a cross-sectional view of a portion of the slider 12 showing the shear based transducer 40 in more detail. Also shown is the read/write pole location which corresponds to the MR element 48. The shear transducer 40 comprises a first insulating layer 50, a second insulating layer 52, conductive metallic layers 54, and a piezoelectric layer 56. To actuate the shear transducer 40, a voltage is applied across shear transducer 40 via conductive metallic layers 54. The applied voltage causes the portion of the slider near the trailing edge surface 42 to move in a direction normal to the surface of disc 16, as illustrated by arrow 58. Because the MR element 48 is deposited in the layer 50 near the trailing edge surface 42, the MR element 48 is moved as well.

The MR element 48 is shown at the bottom of first insulating layer 50 proximal to air bearing surface 44. The MR element 48 represents the portion of magnetic read/write head which contains the read sensor and write poles. The MR element 48 has a height h, which is greatly exaggerated relative to the total height of slider 12 as illustrated in FIG. 3. Typically, the height h of the MR element 48 is on the order of microns. The height of the slider 12 is approximately 0.3 millimeter. Thus, the height of the MR element 48 is roughly 300 times smaller than the height of the slider 12.

The direction in which the MR element 48 moves depends upon the polarity of the voltage applied to the shear transducer 40 at the conductive metallic layers 54. Similarly, the amount of voltage applied to the shear transducer 40 controls the distance that the MR element 48 moves toward or away from the disc 16. Generally, a voltage of 40 volts will displace the shear transducer 40 approximately one microinch.

The shear transducers 40, as well as the read/write heads, are formed at the wafer level using a variety of, for instance, deposition and photolithography techniques. Multiple sliders, up to as many as 40,000, may be formed on one wafer. The wafer is then sliced into bars, each bar having up to 60–70 sliders. The bars are lapped to finish or polish the surface what will eventually become the air bearing surface. As part of the lapping process, the MR element 48 is lapped until it reaches the desired stripe height h.

Figure 4:
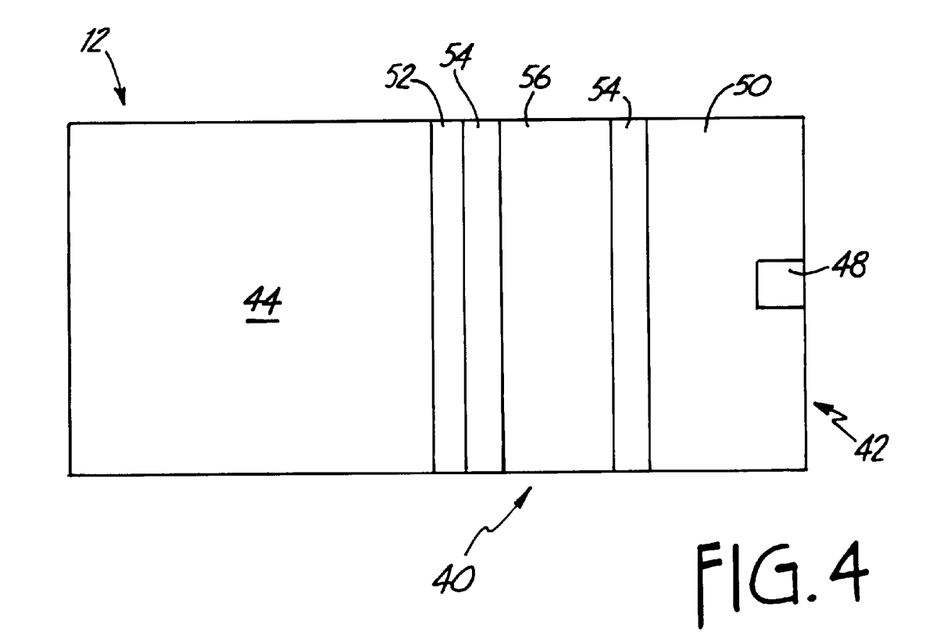
FIG. 4 is a bottom view of a slider illustrating the surface to be lapped.

FIG. 4 is a bottom view of a single slider 12 having a piezoelectric shear based transducer 40. The bottom view shown in FIG. 4 corresponds to what eventually becomes the air bearing surface 44 of the slider 12 and is the surface of the slider 12 which is lapped by a lapping device. Visible on the air bearing surface 44 is the pole area 48 containing the read/write element and shields which will be polished to achieve the desired stripe height of the MR element during the lapping process. Methods of lapping the surface 44 of the slider 12 may include, for instance, a slurry process, a polishing plate using free abrasives such as alumina or diamond dust, or a polishing plate having an abrasive embedded in the plate. The lapping process may begin by performing a more coarse lapping step which removes a larger amount of material from the entire surface 44, followed by a fine lapping step focusing on the trailing edge surface 42, and in particular on the pole area 48 to achieve the desired stripe height of the MR element.

Figure 5:
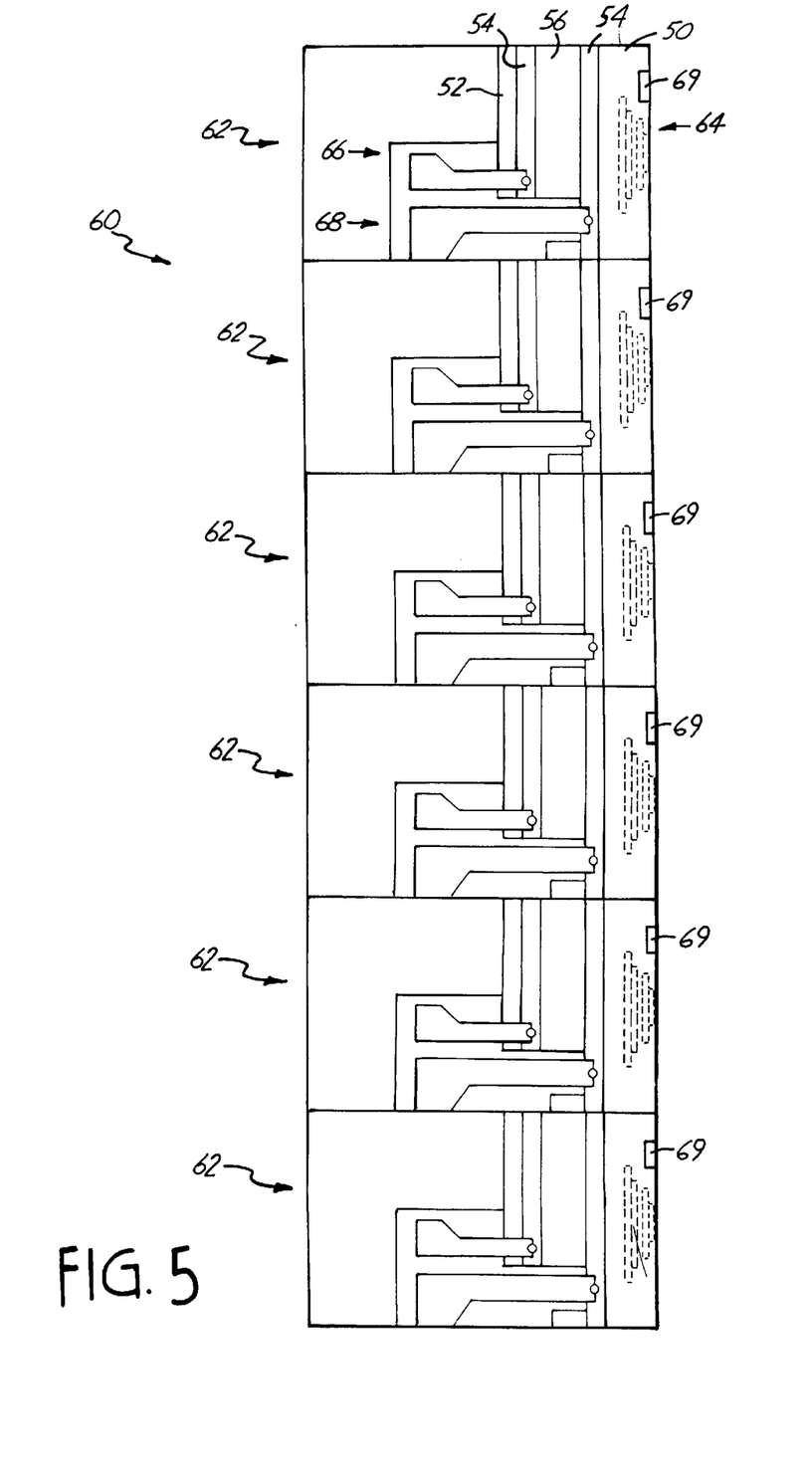
FIG. 5 is a plan view of a bar of sliders having shear based transducers.

Shown in FIG. 5 is a bar 60 which consists of several individual sliders 62. Visible on the individual sliders 62 are a first insulating layer 50, a second insulating layer 52, conductive metallic layers 54, and a piezoelectric layer 56. An outline of read/write head 64 is illustrated showing its location in first insulating layer 50. On the top side of each individual slider 62 are connective leads 66 and 68. Connective leads 66 and 68 are attached to conductive metallic layers 54, which are layered along both sides of piezoelectric layer 56. Piezoelectric layer 56 is actuated by applying a voltage to the connective leads 66 and 68, which moves the portion of the slider 12 carrying the MR element 64 in a manner previously described.

The connections 66, 68 on the bar allow for testing of the shear transducers 40 during manufacturing, either at the wafer level or at the bar level. These same connections 66, 68 can be used during the lapping process to actuate the shear transducers 40 to aid in the final stripe height formation of each stripe associated with the MR elements 64 on the bar 60.

Also shown on the bar 60 are lapping sensors 69 associated with each slider 62. The lapping sensors 69 are lapped at the same time the bar 60 is lapped and provide a measurement of the stripe height as the lapping proceeds. In addition to using a separate sensor 69 for each slider 62 to sense a stripe height of the MR element 48, it is possible to use the MR element 48 itself to sense the stripe height. The MR element 48 is typically comprised of a permalloy material, or other similar suitable material, having a known resistance per unit thickness. Because the width and length of MR element 48 are known values, the measured resistance directly correlates to the height of MR element 48 As such, the resistance of the MR element 48 can be determined based on a voltage across the MR element 48 and the current through the element 48. In addition to using the MR element 48 as a sensor, other suitable methods of determining and monitoring the stripe height during the lapping process may be used with the present invention. As described above, it is highly desirable that accurate and precise control of the stripe height be achieved when manufacturing the slider.

Figure 6:
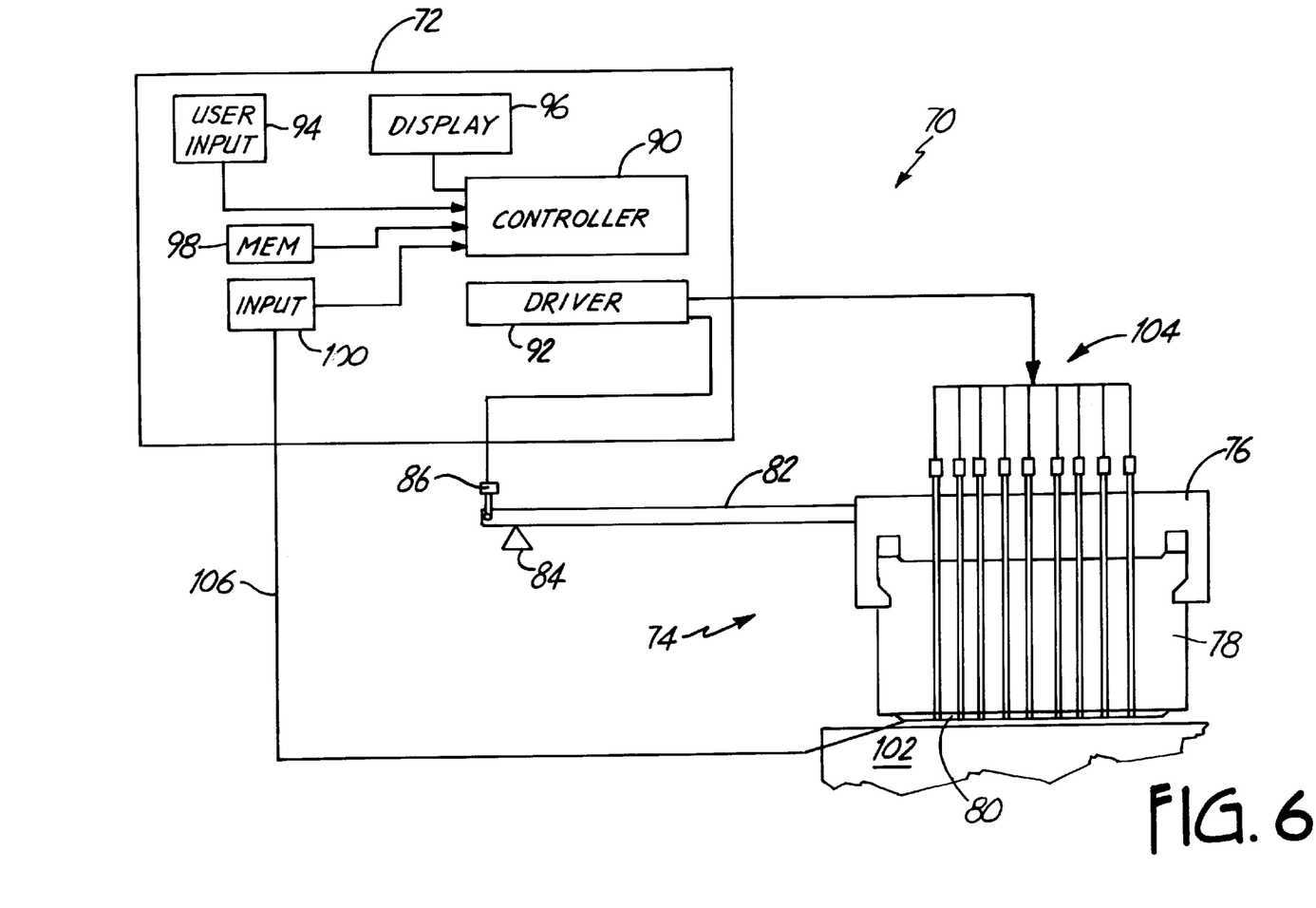
FIG. 6 is an illustration of a control system for use with the present invention.

FIG. 6 is a diagrammatic illustration of a lapping system which may be used to achieve a reduced stripe height, as well as high tolerance control of the lapping process, during lapping of bars of sliders having shear based transducers. The lapping system 70 comprises a control system 72 and a lapping mechanism 74 suitable for use with the present invention. The lapping mechanism 74 comprises a fixture 76 holding a carrier 78 to which is mounted a bar 80. The bar 80 is mounted in the fixture so that the surface on which the MR stripes appear, which corresponds to the surfaces which eventually will become the air bearing surfaces of the sliders, is facing a lapping surface 102. Attached to the fixture 76 is an elongated arm 82 which is coupled to a fulcrum 84. Also attached to the arm 82 is a balancing actuator 86 which is positioned opposite the carrier 78 relative to the fulcrum 84.

The control system 72 comprises a controller 90 and driver 92. Also included as part of the control system 72 is a user input 94 and a display 96. The controller 90 may further include a memory 98. The controller 90 directs the driver 92 to control the balancing actuator 86 which serves to control the balancing arm 82 about fulcrum 84 such that the entire fixture 76, carrier 78, and thus bar 80 can be moved relative to the lapping surface 102.

The control system 72 is configured so that the controller 90 is capable of directing the driver 92 to actuate the shear based transducers of each slider on the bar 80, as illustrated by connections 104. Connections 104 are diagrammatic illustrations and do not represent the actual number of connections made to the bar 80. In addition, the control system 72 comprises a lapping sensor input 100. As illustrated above in FIG. 5, each slider has an associated sensor for sensing the height of the stripe. A feedback connection 106 is in electrical connection with the sensors on each slider, and provides data relating to the sensed stripe height on each slider on the bar to the sensor input 100.

In operation, the controller 90 retrieves instructions and parameters from memory 98, as well as instructions and information from user input 94. During lapping, the status of the lapping process may be displayed on the display 96. Feedback from the sensors on each slider regarding the progress of the lapping operation is received through the feedback connection 106 and is provided to the controller 90 by the input 100. The controller 90 responsively controls the balancing actuator 86 and the shear based transducers 40 on each slider 12 on the bar 80 in response to the data from the input 100. Thus, the lapping system 72 provides a closed loop control system in which the output from the lapping sensors on each slider is used as feedback by the controller 90 to control the shear transducers on each slider from which the feedback originated.

To control the lapping process to achieve the desired stripe height for each stripe on the bar, a beginning height of each stripe must first be determined. The beginning stripe height is determined using the sensor on the bar corresponding to each MR element on each slider. Once a beginning stripe height is determined, the lapping process starts. As the lapping proceeds, material is removed from the surface of the bar 80. As material is removed by the lapping device, the stripe height is monitored using the stripe height sensor. As explained above, a separate sensor may be provided on each slider to indicate the stripe height. In addition, it is possible to use the MR element directly as the sensor to determine the strip height. When using the MR element directly as the height sensor, the resistance of the MR element can be monitored as the lapping proceeds to determine the stripe height. Based on feedback from the height sensors, the control system 72 can actuate the shear transducer of each slider on the bar to ensure each MR element on each slider is lapped to the desired stripe height.

To actuate the shear transducers, a voltage is applied to conductive metallic layers 60 on the individual sliders 72 located on the bar 70. The applied voltage actuates piezoelectric layer 62, causing the stripe to be moved either toward or away from the lapping surface. When the ideal stripe height is achieved on a slider, the voltage across the piezoelectric layer of that slider can be controlled so that the slider is removed from the lapping surface.

Thus, the present invention provides a method of achieving a desired stripe height for each slider on the bar. Each slider on the bar can be individually controlled so that even though one slider has been lapped to achieve the desired stripe height, an adjacent slider continues to be lapped until it likewise reaches the desired stripe height. Once all individual sliders 12 have obtained the ideal stripe height, the bar 80 can be removed from the lapping surface 102 using the balancing actuator 86.

Although the present invention has been described with reference to preferred embodiments, one skilled in the art will recognize that changes may be made in form and detail without departing from the spirit and scope of the invention. For instance, while discussed in terms of lapping a bar of sliders, the present invention can likewise be practiced on individual sliders, or at the wafer level, or any other suitable configuration.

What is claimed is:

1. A method for lapping a bar of sliders so that a magnetoresistive element on each slider on the bar is individually lapped to a desired stripe height, the method comprising:

providing a bar of sliders wherein each slider on the bar comprises a shear based transducer;

sensing a stripe height of the magnetoresistive element on each slider;

lapping the magnetoresistive element on each slider; and actuating the shear based transducer of each slider during lapping based on the sensed stripe height of each slider to control a position of the trailing edge of each slider so that the magnetoresistive element on each slider is individually lapped to the desired stripe height.

2. The method of claim 1 and further comprising performing a preliminary lapping before sensing the magnetoresistive element height.

3. The method of claim 1 wherein the shear based transducer comprises a piezoelectric structure and actuating the shear based transducer comprises applying a voltage to the piezoelectric structure.

4. The method of claim 3 wherein the piezoelectric structure is polarized such that actuating the shear based transducer comprises applying voltage to the piezoelectric structure to shear a portion of the slider carrying a stripe and move the stripe relative to a lapping device.

5. The method of claim 4 wherein the voltage applied to the piezoelectric layer is a function of the sensed stripe height and the desired stripe height.

6. The method of claim 4 wherein actuating the shear based transducer for a particular slider causes the trailing edge of the slider to displace about 1 micro inch along a generally vertical axis relative to the lapping device.

7. The method of claim 1 wherein sensing the height of the magneto-resistive element comprises measuring a resistance across the magneto-resistive element.

8. A system for lapping a bar of sliders to achieve a desired magneto-resistive element stripe height on each slider, the system comprising:

a lapping device for lapping the bar of sliders;

shear based transducer associated with each slider on the bar capable of positioning a portion of each slider carrying a magneto-resistive element relative to the lapping device;

a sensor associated with each slider for providing a signal representative of a stripe height for each slider on the bar; and a control system for controlling each shear based transducer based on the sensed stripe height and the desired stripe height so that each shear based transducer positions the portion of an associated slider carrying the magneto-resistive element relative to the lapping device to achieve the desired stripe height on each slider on the bar.

9. The system of claim 8 wherein the shear based transducer comprises a piezoelectric structure.

10. The system of claim 9 wherein the control system controls the shear based transducer by applying a voltage to the piezoelectric structure causing the piezoelectric structure to shear.

11. The system of claim 8 wherein the sensor associated with each slider for sensing the stripe height comprises the magneto-resistive element itself.

12. The system of claim 11 wherein the feedback from the sensor comprises a resulting resistance after applying a voltage to the magneto-resistive element.

13. A method of individually lapping a slider so a magnetoresistive element on the slider is lapped to a desired stripe height, the method comprising:

providing a shear based transducer on the slider, lapping the slider;

sensing a stripe height of the magnetoresistive element on the slider;

comparing the sensed stripe height to a desired stripe height for the magnetoresistive element of the slider; and controlling the shear based transducer on the slider during lapping based on the comparison between the sensed stripe height and the desired stripe height of the magnetoresistive element.

14. The method of claim 13 wherein sensing a stripe height of the magneto-resistive element on the slider comprises using the magneto-resistive element as a sensor.

15. The method of claim 14 wherein using the magneto-resistive element as a sensor comprises measuring a resistance across the magneto-resistive element.

16. The method of claim 13 wherein the shear based transducer comprises a piezoelectric structure and controlling the shear based transducer comprises applying a voltage to the piezoelectric structure to actuate it.

17. The method of claim 16 wherein the piezoelectric structure is polarized and actuating the shear based transducer comprises applying voltage to the piezoelectric structure to shear a portion of the slider carrying the magneto-resistive element to move the portion of the slider carrying the magneto-resistive element relative to a lapping device.

18. The method of claim 13 and further comprising performing a preliminary lapping before sensing a stripe height of the magnetoresistive element on the slider.

* * * * *

UNITED STATES PATENT AND TRADEMARK OFFICE
CERTIFICATE OF CORRECTION

PATENT NO. : 6,568,992 B1  Page 1 of 1
DATED : May 27, 2003
INVENTOR(S) : Zine-Eddine Boutaghou et al.

It is certified that error appears in the above-identified patent and that said Letters Patent is hereby corrected as shown below:

<u>Title page,</u>
Item [56], please insert the following cited references under References Cited, U.S. PATENT DOCUMENTS --

| | | | | | |
|---|---|---|---|---|---|
| 3,732,552 | 05/08/73 | Walraven | 340 | 174.1 | 08/24/71 |
| 4,340,956 | 07/20/82 | Miller | 369 | 244 | 04/10/80 |
| 4,605,977 | 08/12/86 | Matthews | 360 | 103 | 12/14/83 |
| 4,669,011 | 05/26/87 | Lemke | 360 | 103 | 05/03/85 |
| 4,853,810 | 08/01/89 | Pobl et al. | 360 | 103 | 11/23/85 |
| 5,021,906 | 06/04/91 | Chang et al. | 360 | 103 | 10/31/89 |
| 5,276,573 | 01/04/94 | Harada et al. | 360 | 103 | 12/02/91 |
| 5,377,058 | 12/27/94 | Good et al. | 360 | 75 | 12/31/92 |
| 5,764,432 | 06/09/98 | Kasahara | 360 | 75 | 01/24/96 |
| 6,069,770 | 05/30/00 | Cui et al. | 360 | 103 | 10/04/99 -- |

Signed and Sealed this

Fourth Day of November, 2003

JAMES E. ROGAN
*Director of the United States Patent and Trademark Office*